April 26, 1955     J. RILEY     2,706,848
INSERTED BLADE HOB
Filed May 1, 1952

INVENTOR.
JOSEPH RILEY.
BY
HIS ATTORNEY.

United States Patent Office 2,706,848
Patented Apr. 26, 1955

2,706,848
INSERTED BLADE HOB

Joseph Riley, Springfield, Vt., assignor to The Fellows Gear Shaper Company, Springfield, Vt., a corporation of Vermont Application May 1, 1952, Serial No. 285,465

6 Claims. (Cl. 29—105)

The present invention relates to rotary cutters and the like and specifically to rotary cutters of the type which are known as hobs and which are used in the production of gear teeth and similar shaped objects. More particularly, the present invention pertains to certain improvements in inserted tooth hobs.

The primary object of this invention is to provide a hob in which the cutting elements are inserted and which elements are removable. Each cutting element may be made separately from the hob body. By reason of this construction, it will be clear that the cutting element may be made of high-speed steel or any of the well-known carbides while the hob body itself is made of cheaper, softer material.

Another object of the invention is to provide cutting elements of a specific character which may be repeatedly sharpened and which will have a prolonged life over those previously used.

Another object of the invention is to provide a new means for securing the insertable teeth in the hob body so that the teeth may be firmly held against movement and so that they may be accurately located with respect to each other and with respect to the hob body.

Yet another object of the invention consists of a means for locating the cutting teeth in the cutting elements accurately with respect to each other so that a high degree of cutting accuracy may be obtained.

Further objects and advantages of the present invention will be apparent from the following specification taken in connection with the accompanying drawing which forms a part thereof. In the accompanying drawing, like reference characters designate the same parts wherever they occur in all the figures.

Figure 1:
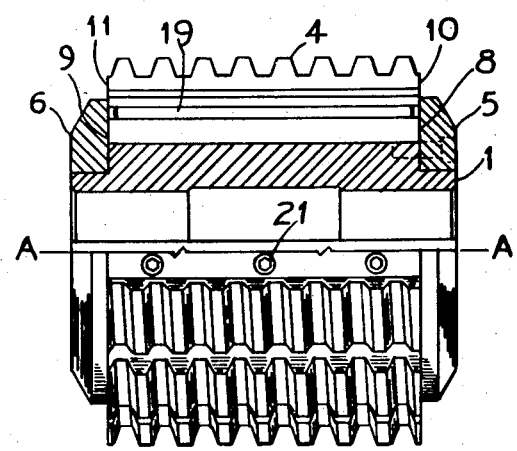
Figure 1 is a front elevation of the hob partly in section showing the longitudinal disposition of the cutting elements and the means for holding said elements in position.
Figure 2:
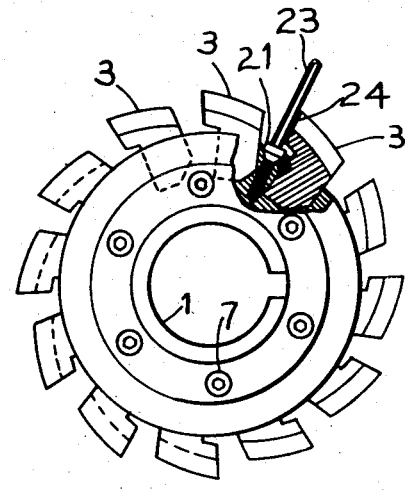
Figure 2 is an end view of the hob partly in section showing the means for securing the cutting elements in the hob body and a means for actuating the securing means.

The hob body 1 is formed with a plurality of longitudinal slots 2 angularly spaced around the periphery of the body. These longitudinal slots 2 are adapted to receive the cutter elements 3 which have a series of cutting teeth 4 formed thereon. As shown in the drawing, the cutting teeth 4 are of the usual rack shape but may be modified in any desired manner to produce the desired shape on the gear or other work piece being formed. The teeth 4 of the successive elements 3 which are spaced around the axis of rotation A—A of the hob are helically disposed in accordance with customary practice.

The cutter elements 3 are held against any longitudinal movement in the cutter body 1 by collars 5 and 6. These collars 5 and 6 are firmly secured in the hob body by means of cap screws 7 which are spaced angularly about the axis of rotation of the hob. The inner surfaces 8 and 9 respectively of the collars 5 and 6 are accurately machined so as to be as flat as possible. These surfaces 8 and 9 serve to accurately locate the cutting elements 3 in their axial position. By removing material from the surfaces 8 or 9 of the plates 5 and 6, the cutting elements 3 may be adjusted longitudinally and definitely located in the desired axial position.

By machining the ends 10 and 11 of the cutter elements 3 to any desired degree of accuracy, it is possible to locate the cutting teeth 4 of the cutting elements 3 within the same degree.

Figure 3:
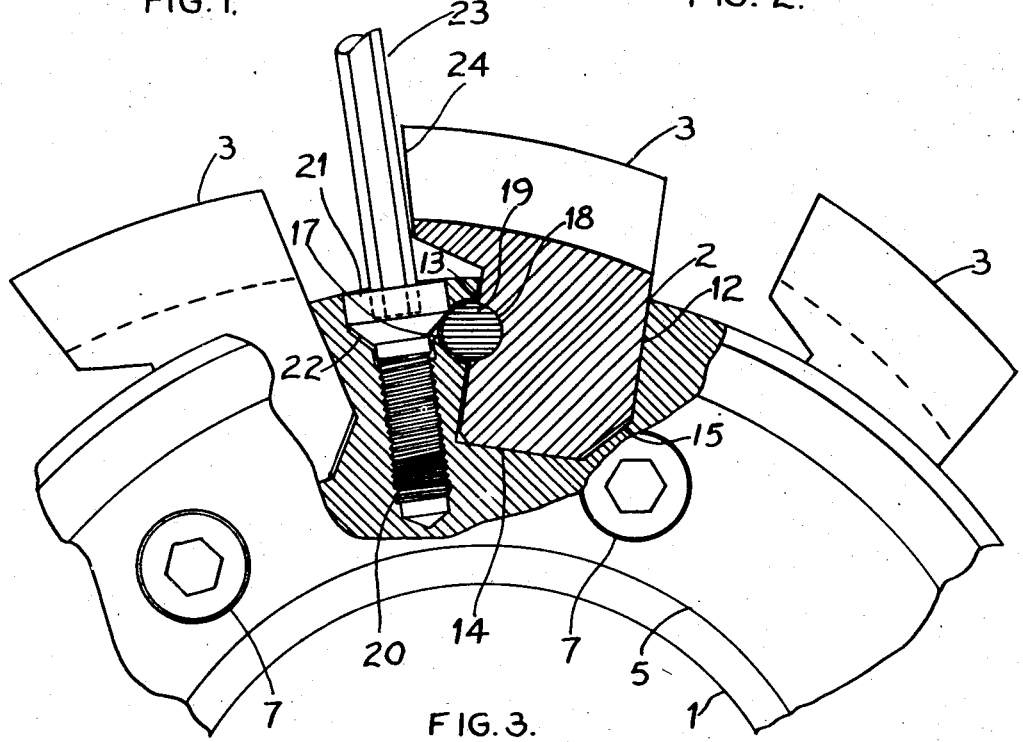
Figure 3 is an enlarged view of a portion of Figure 2 showing in detail the securing means with a means to actuate said securing means shown in operative position.

As shown specifically in Figure 3, the slots 2 have a rear face 12 and a leading face 13. The faces 12 and 13 are substantially parallel in the preferred embodiment. There is also a bottom wall 14. This bottom wall on all of the slots is preferably disposed at the same radial distance from the axis of rotation of the hob so that all of the cutting teeth 4 are similarly disposed in order to obtain the desired accuracy in the work. The body portions of the cutting elements 3 are formed complemental to the shape of slots 2.

Adjoining the rear face 12 and the bottom 14 of each slot 2 is an angularly disposed wall 15. In the front face 13 of each slot is a semi-circular groove 17 which is arranged contiguous to a semi-circular groove 18 formed in the cutting element 3. When the cutting elements 3 are placed in the hob body, the grooves 17 and 18 cooperate to form a circular opening. In this circular opening is placed a locking pin 19.

Threaded openings 20 are formed in the hob body 1 and in these threaded openings are inserted conically headed set screws 21. The conical face 22 of these set screws abut the cylindrical pins 19. Due to the conical disposition of the surface 22, the cutting elements will be forced against the rear wall 12, the bottom wall 14, and the angularly disposed surface 15 when the screws 21 are inserted into the hob body. A wrench member 23 may be employed to rotate the set screws 21. The surface 15 is preferably arranged so that a radius of the cylindrical pin 19 is substantially perpendicular thereto. As many screws 21 may be used as is necessary to hold the cutting element firmly against the rear wall 12 and bottom wall 14. In the present instance, three such screws are shown in securing each cutting element. A small amount of clearance is initially provided between the cutting element 3 and the surface 15 so as to allow for substantial tightening of the cutting element 3 into position in the slot 2.

As shown in the drawings, each cutting element has an extending overhanging portion 24. As will be apparent from the drawing, this overhanging portion extends forwardly of the body of the cutting element 3 and partly over the means for securing the elements in position in the hob body, namely, the cylindrical pin 19 and the set screw 21. By reason of this overhanging portion, a large number of re-grinding operations may be employed and the life of the cutting elements is greatly extended.

While pins 19 are shown and described as being cylindrical, other shapes of pins may be utilized to cooperate with the set screws 21 to hold the cutting elements in position when placed in the hob body. In such cases, the grooves 18 and 19 will be complemental to the shape of the pins. Also, the pin 19 may, if desired, be formed integrally with or secured to the cutting element 3. The pins should be slightly shorter in length than cutting elements 3 so that plates 5 and 6 will effectively clamp the elements against axial movement. Since there is no wedging action between the cutting elements 3 and the hob body 1, it will be obvious that upon slackening up of the set screws 21, that the cutting elements may be easily removed from the hob body when either or both of the end plates 5 or 6 have been removed.

Due to the construction shown and described above, it is possible to manufacture the cutting elements all on a mass production basis and to obtain a hob with much less expense than hitherto possible.

As will be apparent from the specific embodiment of the invention described above, other modifications may be made without departing from the scope of the invention as set forth in the appended claims.

What I claim is:

1. In a gear cutting hob, a generally cylindrical hob body having a plurality of longitudinally extending slots therein, said slots having forward and rear walls, cutting elements in said slots having base portions complemental to said walls, securing means inserted in said hob body, said securing means consisting of a pin member extending longitudinally of said hob body and cooperating fastening members having a conical face abutting said pin member, said securing means cooperating with the front face of said base portions to force said elements firmly against said rear wall, said securing means lying within the ends of said cutting elements and cutting portions on said cutting elements extending circumferentially over said forward walls and similarly overhanging said securing means.

2. In a gear cutting hob, a generally cylindrical hob body having a plurality of longitudinally extending slots therein, said slots having forward and rear walls, cutting elements in said slots having base portions complemental to said walls, securing means inserted in said hob body cooperating with the front face of said base portions to force said elements firmly against said rear wall, said securing means lying within the ends of said cutting elements, cutting portions on said cutting elements extending circumferentially over said forward walls and similarly overhanging said securing means, and end plates abutting the ends of said cutting elements to locate and hold them in the correct axial position.

3. In a hob of the type described, a hob body having longitudinal slots formed therein, said slots having in one face thereof a semi-circular channel, and substantially parallel walls, the rear wall of said slots being formed with an angularly disposed portion, cutting blades inserted in said slots, said cutting blades having semi-circular channels in their leading faces, and being formed complemental to the shape of the walls of said slots, said channels cooperating to form circular openings, cylindrical pin members in said openings extending lengthwise of said cutting elements, and a fastening member having a conical face inserted in said body, said conical face having substantially the same angularity as said angularly disposed portion and being disposed to coact with said pin member to hold said cutting elements in position in said body.

4. In a hob of the type described, a hob body having longitudinal slots formed therein, said slots having in one face thereof a semi-circular channel, and said slots having substantially parallel walls, the rear wall of said grooves being formed with an angularly disposed portion, cutting blades inserted in said slots, said cutting blades having semi-circular channels in their leading faces, and said blades being formed complemental to the walls of said slots, and said channels cooperating to form a circular opening, a cylindrical pin member in said opening extending lengthwise of said cutting elements, and a fastening member having a conical face inserted in said body, said conical face having substantially the same angularity as said angularly disposed portion and coacting with said pin member to hold said cutting elements in position in said body and to force said cutting elements inwardly and rearwardly against said rear wall and said angularly disposed portion.

5. In a hob of the type described, a hob body having longitudinal grooves formed therein, said grooves having substantially parallel walls, the rear wall of said groove being formed with an angularly formed portion, overhanging cutting blades formed complemental to said grooves and mounted therein, the front wall of the groove and the front wall of the cutting blade having opposed channels cooperating to form openings adapted to receive pin members, said openings extending lengthwise of said cutting elements, pin members in said openings, fastening members having a conical face inserted in said hob body, said conical face coacting with said pin members to hold said cutting elements in position in said body, the angularly formed portion of said cutting element and the angularly formed portion of the longitudinal grooves being spaced apart to provide clearance therebetween, said clearance being adapted to absorb pressure exerted by said conical faced fastening member.

6. In a hob of the type described, a hob body having longitudinal grooves formed therein, said grooves having in one face thereof a longitudinal channel, and having substantially parallel walls, the rear wall of said grooves being formed with an angularly disposed portion, cutting elements having a forwardly extending cutting portion thereon inserted in said grooves, said cutting elements having longitudinal channels formed in their leading faces, and being formed complemental to said grooves, said longitudinal channels being formed to receive insertable blade holding means, blade holding means in said channels extending lengthwise of said cutting elements, a fastening member having a conical face inserted in said body and said conical face coacting with said blade holding means to hold said cutting elements in position in said body with said forwardly extending portion overhanging said holding means.

References Cited in the file of this patent

UNITED STATES PATENTS

| | | |
|---|---|---|
| 1,184,368 | Morgal | May 23, 1916 |
| 1,295,171 | Hunter | Feb. 25, 1919 |
| 1,432,580 | Vauclain et al. | Oct. 17, 1922 |
| 1,434,421 | Arntz | Nov. 7, 1922 |
| 1,756,986 | Miller | May 6, 1930 |
| 2,567,167 | Drader | Sept. 11, 1951 |

FOREIGN PATENTS

| | | |
|---|---|---|
| 379,938 | France | Nov. 22, 1907 |
| 593,531 | Germany | Feb. 28, 1934 |